(12) United States Patent
Liu et al.

(10) Patent No.: US 8,909,206 B2
(45) Date of Patent: Dec. 9, 2014

(54) COMMUNICATIONS SYSTEM, DEVICE WITH DIALING FUNCTION AND METHOD THEREOF

(75) Inventors: Po-Hsien Liu, Taipei Hsien (TW); Chen-Huang Fan, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1052 days.

(21) Appl. No.: 12/888,420

(22) Filed: Sep. 23, 2010

(65) Prior Publication Data

US 2011/0244842 A1  Oct. 6, 2011

(30) Foreign Application Priority Data

Mar. 31, 2010  (CN) .......................... 2010 1 0137019

(51) Int. Cl.
*H04M 3/42* (2006.01)
*H04M 1/725* (2006.01)
*H04M 1/2745* (2006.01)
*H04M 3/46* (2006.01)

(52) U.S. Cl.
CPC *H04M 1/274583* (2013.01); *H04M 2203/2072* (2013.01); *H04M 1/72566* (2013.01); *H04M 3/42263* (2013.01); *H04M 3/46* (2013.01)

USPC .......................................... 455/417

(58) Field of Classification Search
USPC ................. 455/416–420, 412–2, 556.1, 557; 348/14.01–14.03, 14.05, 14.08–14.09
See application file for complete search history.

(56) References Cited

U.S. PATENT DOCUMENTS

2004/0234061 A1* 11/2004 Koch et al. ............... 379/207.02
2007/0036279 A1*  2/2007 Tam et al. ...................... 379/45

* cited by examiner

*Primary Examiner* — Brandon Miller
(74) *Attorney, Agent, or Firm* — Novak Druce Connolly Bove + Quigg LLP

(57) ABSTRACT

A communications system includes a caller device, a receiver device, and a communications device. The communications device includes a storage unit, a communications unit, and a processing unit. Each called party is assigned an identifier, and has one or more receiver device. Each receiver device is assigned a phone number. The storage unit stores a phone number of each receiver device associated with a called party. The processing unit includes a request receiving module for receiving a request, a request recognition module for determining whether the identifier from the request matched one of the identifier of the called party; an acquiring module for acquiring the phone numbers of one called party when matching. The communications unit dials the acquired phone numbers to establish communications with the receiver device.

12 Claims, 4 Drawing Sheets

| Name | Stephy | | |
|---|---|---|---|
| Types | Phone number | Predetermined dialing time periods | Dialing priority |
| Mobile phone | 137*** | 17:00-22:00<br>10:00-12:00 | 1 |
| PAS | 0755*** | 12:00-17:00 | 4 |
| Home phone | 0755*** | 18:00-22:00 | 3 |
| Office phone | 0755*** | 08:00-17:30 | 2 |

FIG. 2

COMMUNICATIONS SYSTEM, DEVICE WITH DIALING FUNCTION AND METHOD THEREOF

BACKGROUND

1. Technical Field

The present disclosure relates to communications system and, particularly, to a communications system with a dialing function and a communications device and a method thereof.

2. Description of Related Art

Electronic devices, such as mobile phones, often include a directory for recording contact information. However, using the directory may be confusing and difficult for people. Users may accidentally delete contact information. There also may be occasions when a user wishes to call a contact whom has more than one number recorded in the directory. After completing the process of selecting one of the numbers and the calling is not successful, such as when there is no answer, then the process must be repeated to try the next number of the same contact and so on until all numbers have been tried or a call is successfully connected. All of which is time-consuming, and inconvenient.

BRIEF DESCRIPTION OF THE DRAWINGS

FIG. 2 is a table showing relationships among caller name, phone number, predetermined dialing time periods with dialing priority relative to others.

DETAILED DESCRIPTION

Figure 1:
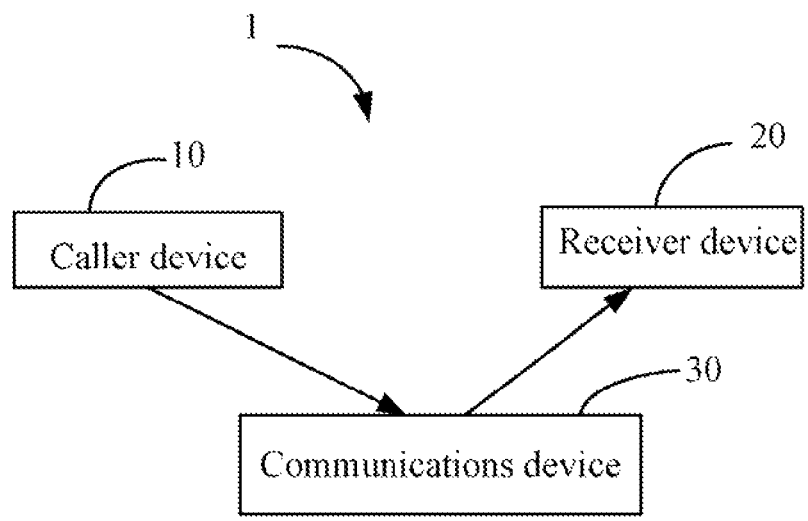
FIG. 1 is a schematic diagram of a communications system, including a caller device, a receiver device, and a communications device with dialing function between the caller device and the receiver device, in accordance with an exemplary embodiment.

Referring to FIG. 1, an embodiment of a communications system 1 is illustrated. The communications system 1 includes a caller device 10, a receiver device 20, and a communications device 30. The caller device 10 is configured for making a request to the communications device 30 in response to an operation from a caller. The caller device 10 includes a number of called parties. The communications device 30 is configured for making a call to the receiver device 20 in response to the request from the caller device 10. The receiver device 20 is configured for receiving the call from the communications device 30 to establish a communications with the caller device 10. In one embodiment, the caller device 10 and the receiver device 20 may be mobile phones, home phones, etc. The request from the caller device 10 may be to establish a voice call, or receive a short message, etc.

Each called party is assigned an identifier, and includes a number of phone numbers. Each phone number is assigned one or more predetermined dialing time periods during which the receiver device 20 is likely to be answered by the called party, and a dialing priority which represents a rank of the receiver device 20 among all other receiver devices 20 sharing the same time periods (overlapping dialing time periods). Each request from the caller device 10 includes an identifier of the called party. For the purpose of better understanding the present disclosure, each called party has four receiver devices 20 as shown in FIG. 2: a mobile phone, a Personal Access Phone System (PAS) phone, a home phone, and an office phone. Referring to FIG. 2, the phone number of the PAS phone is 0755 . . . , the predetermined dialing time period of the PAS phone is from 12:00 to 17:00, and the dialing priority of the PAS phone is four. For example, 19:00 falls into two dialing time periods; from 17:00 to 22:00 for the mobile phone and from 18:00 to 22:00 for the home phone, meaning there are two phone numbers 137* and 0755* that are most likely to be answered at 19:00. Because the dialing priority of the mobile phone number 137 . . . is 1, and the dialing priority of the phone number 0755* is 3, the mobile phone number 137* is a first choice for the communications device 30 to dial, and the home phone number 0755*** is a second choice for the communications device 30 to dial.

Figure 3:
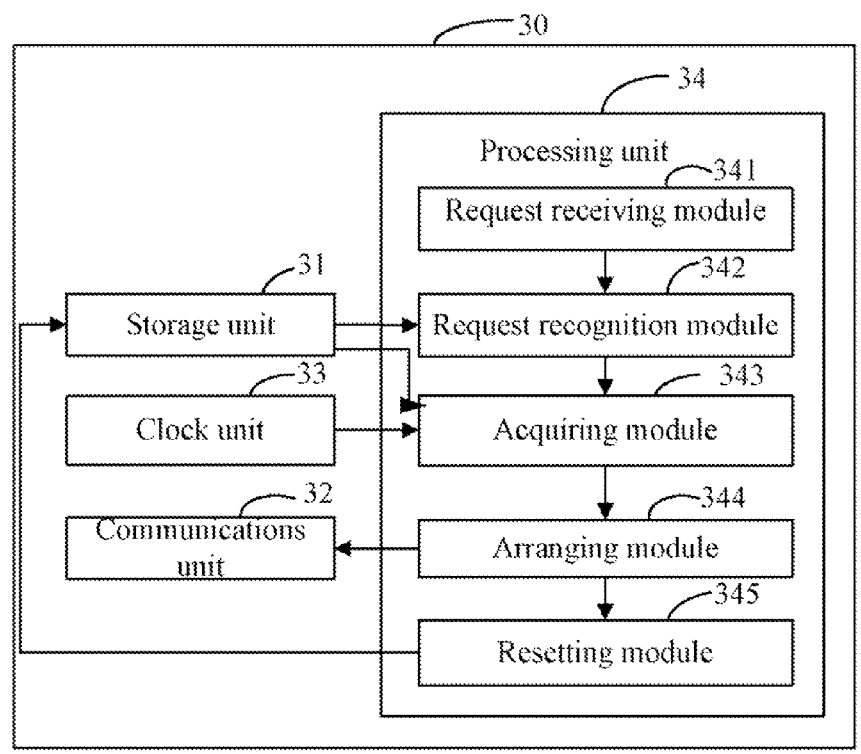
FIG. 3 is a block diagram of a hardware infrastructure of the communications device of FIG. 1 in accordance with an exemplary embodiment.

Referring to FIG. 3, the communications device 30 includes a storage unit 31, a communications unit 32, a clock unit 33, and a processing unit 34. The storage unit 31 is configured for storing the phone numbers and the predetermined dialing time periods and the dialing priorities associated with the phone numbers.

The clock unit 33 is configured for providing a current time to the processing unit 34.

The processing unit 34 includes a request receiving module 341, a request recognition module 342, an acquiring module 343, and an arranging module 344.

The request receiving module 341 is configured for receiving the request from the caller device 10.

The request recognition module 342 is configured for acquiring an identifier from the request, and determining whether the acquired identifier matches one of the identifiers associated with the called parties. In one embodiment, if the acquired identifier does not match any identifier associated with the receivers, the request recognition module 342 generates a prompt with words such as, "sorry, there is no party among your contacts associated with this number" to the caller.

The acquiring module 343 is configured for acquiring one or more phone numbers associated with a corresponding called party having the matched identifier, from the storage unit 31.

The arranging module 344 is configured for selecting one or more phone numbers associated with the one or more predetermined dialing time periods in which the current time from the clock unit 33 falls into, from the acquired one or more phone numbers, and sorting the selected one or more phone numbers into order according to the dialing priorities of the corresponding receiver devices 20.

The communications unit 32 dials the first sorted phone number to establish the communications with the corresponding receiver device 20.

In another embodiment, the processing unit 34 further includes a resetting module 345. The resetting module 345 is configured for resetting the plurality of phone numbers for each called party in response to a reset request from the caller device. Typically, the resetting module 345 resets the one or more predetermined dialing time periods and the dialing priority for each of the plurality of phone numbers in response to the request from the caller device. For example, the caller can use the caller device 10 to send a setting message to a predetermined number such as, 10086 . . . which is assigned to the communications device 30 to ask the communications device 30 to reset the phone number, the one or more predetermined dialing time periods, and the dialing priority of the receiver device 20 of the called party in response to the request from the caller device 10.

Figure 4:
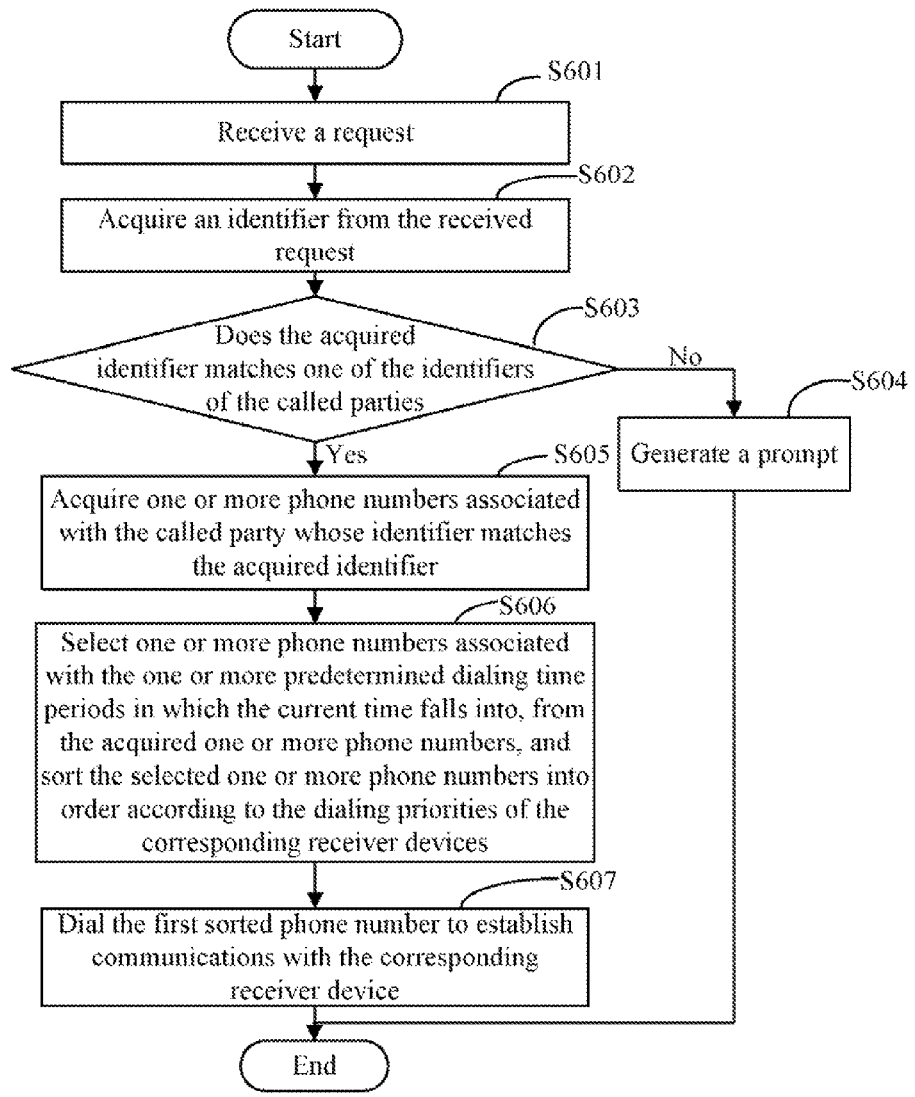
FIG. 4 is a flowchart of a method for setting a dialing function implemented by the communications device of FIG. 2 in accordance with an exemplary embodiment.

Referring to FIG. 4, a method for setting a dialing function is provided.

In step S601, the request receiving module 341 receives the request from the caller device 10.

In step S602, the request recognition module 342 acquires an identifier from the request.

In step S603, the request recognition module 342 determines whether the acquired identifier matches one of the identifiers associated with the called parties.

In step S604, if the acquired identifier does not match any identifier associated with the called parties, the request recognition module 342 generates a voice prompt as detailed above.

In step S605, the acquiring module 343 acquires one or more phone numbers associated with the called party whose identifier matches the acquired identifier, from the storage unit.

In step S606, the arranging module 344 selects one or more phone numbers associated with the one or more predetermined dialing time periods in which the current time from the clock unit 33 falls into, from the acquired one or more phone numbers, and sorts the selected one or more phone numbers into order according to the dialing priorities of the corresponding receiver devices 20.

In step S607, the communications unit 32 dials the first sorted phone number to establish communications with the corresponding receiver device 20.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A communications system with a dialing function comprising:
   a receiver device;
   a communications device; and
   a caller device configured for making a request to the communications device in response to an operation from a caller, the caller device comprising a plurality of called parties, each request from the caller device comprising a first identifier of the called party, each called party associated with a second identifier and comprising a plurality of phone numbers, wherein each phone number is assigned a predetermined dialing time period and a dialing priority;
   the communications device configured for making a call to the receiver device in response to the request from the caller device according to the dialing priority of a corresponding phone number;
   wherein the communications device comprises:
      a storage unit configured for storing the plurality of phone numbers for each called party, the predetermined dialing time period of each phone number, and the dialing priority of each phone number;
      a clock unit configured for providing a current time;
      a processing unit comprising:
         a request receiving module configured for receiving the request from the caller device;
         a request recognition module configured for acquiring the first identifier from the request, and determining whether the acquired first identifier matches one of the second identifiers associated with the called parties;
         an acquiring module configured for acquiring the one or more phone numbers associated with a corresponding called party having the matched second identifier from the storage unit;
         an arranging module configured for selecting one or more phone numbers associated with one or more predetermined dialing time periods in which the current time from the clock unit falls into, from the acquired one or more phone numbers; and
         the arranging module further configured for sorting the selected one or more phone numbers in an order according to the dialing priorities of the phone numbers; and
      a communications unit configured for dialing a first sorted phone number.

2. The communications system as described in claim 1, wherein the processing unit further comprises a resetting module, the resetting module is configured for resetting the plurality of phone numbers for each called party in response to a reset request from the caller device.

3. The communications system as described in claim 2, wherein the resetting module is further configured for resetting the one or more predetermined dialing time periods and the dialing priority for each of the plurality of phone numbers in response to the reset request from the caller device.

4. The communications system as described in claim 1, wherein when the acquired first identifier does not match any second identifier of the called party, the request recognition module generates a prompt to the caller.

5. A communications device configured for receiving a request from a caller device to establish communication with a receiver device, wherein the caller device comprises a plurality of called parties, each request from the caller device comprises a first identifier of the called parties, each called party is associated with a second identifier and comprises a plurality of phone numbers, each phone number is assigned a predetermined dialing time period and a dialing priority, the communications device comprising:
   a storage unit configured for storing the plurality of phone numbers for each called party, the predetermined dialing time period of each phone number, and the dialing priority of each phone number;
   a clock unit configured for providing a current time;
   a processing unit comprising:
      a request receiving module configured for receiving the request from the caller device;
      a request recognition module configured for acquiring the first identifier from the request, and determining whether the acquired first identifier matches one of the second identifiers associated with the called parties;
      an acquiring module configured for acquiring the one or more phone numbers associated with a corresponding called party having the matched second identifier from the storage unit;
      an arranging module configured for selecting one or more phone numbers associated with one or more predetermined dialing time periods in which the current time from the clock unit falls into, from the acquired one or more phone numbers; and
      an arranging module further configured for sorting the selected one or more phone numbers in an order according to the dialing priorities of the phone numbers; and
   a communications unit configured for dialing a first sorted phone number.

6. The communications device as described in claim 5, wherein the processing unit further comprises a resetting module, the resetting module is configured for resetting the plurality of phone numbers for each called party in response to a reset request from the caller device.

7. The communications device as described in claim 6, wherein the resetting module is further configured for resetting the one or more predetermined dialing time periods and the dialing priority for each of the plurality of phone numbers in response to the reset request from the caller device.

8. The communications device as described in claim 5, wherein when the acquired first identifier does not match any second identifier of the called party, the request recognition module generates a prompt to the caller.

9. A method for setting a dialing function implemented by a communications device, wherein the communications device is configured for receiving a request from a caller device to establish communication with a receiver device, the caller device comprises a plurality of called parties, each request from the caller device comprises a first identifier of the called parties, each called party is associated with a second identifier and comprises a plurality of phone numbers, each phone number is assigned a predetermined dialing time period and a dialing priority, the method comprising:
- storing the plurality of phone numbers for each called party, the predetermined dialing time period of each phone number, and the dialing priority of each phone number;
- providing a current time;
- receiving the request from the caller device;
- acquiring the first identifier from the request, and determining whether the acquired first identifier matches one of the second identifiers associated with the called parties;
- acquiring the one or more phone numbers associated with a corresponding called party having the matched second identifier;
- selecting one or more phone numbers associated with one or more predetermined dialing time periods in which the current time from the clock unit falls into, from the acquired one or more phone numbers;
- sorting the selected one or more phone numbers in an order according to the dialing priorities of the phone numbers; and
- dialing a first sorted phone number.

10. The method as described in claim 9, further comprising:
- resetting the plurality of phone numbers for each called party in response to a reset request from the caller device.

11. The method as described in claim 10, further comprising:
- resetting the one or more predetermined dialing time periods and the dialing priority for each of the plurality of phone numbers in response to the reset request from the caller device.

12. The method as described in claim 9, further comprising:
- generating a prompt to the caller when the acquired first identifier does not match any second identifier of the called party.

* * * * *